(No Model.)
A. G. TAYLOR.
PLUMB LEVEL.
No. 474,152. Patented May 3, 1892.
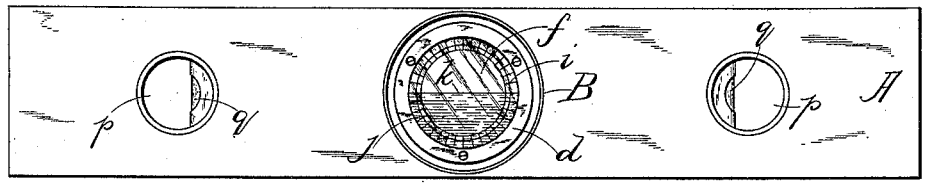
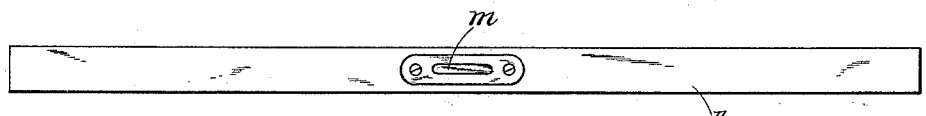
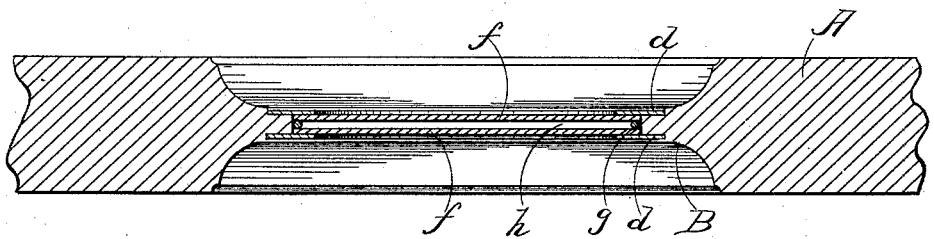

UNITED STATES PATENT OFFICE.

AGUSTUS G. TAYLOR, OF CLAREMONT, NEW HAMPSHIRE.

PLUMB-LEVEL.

SPECIFICATION forming part of Letters Patent No. 474,152, dated May 3, 1892.

Application filed December 15, 1891. Serial No. 415,137. (No model.)

*To all whom it may concern:*

Be it known that I, AGUSTUS G. TAYLOR, of Claremont, in the county of Sullivan, State of New Hampshire, have invented certain new and useful Improvements in Plumbs and Levels, of which the following is a description sufficiently full, clear, and exact to enable any person skilled in the art or science to which said invention appertains to make and use the same, reference being had to the accompanying drawings, forming part of this specification, in which—

Figure 1 is a side elevation of my improved level; Fig. 2, a top plan view of the same, and Fig. 3 a horizontal section illustrating details of construction.

Like letters of reference indicate corresponding parts in the different figures of the drawings.

My invention relates especially to a plumb and level of the class ordinarily employed by carpenters, masons, and others in similar occupations; and it consists in certain novel features hereinafter fully set forth and claimed, the object being to produce a simpler, cheaper, and more effective device of this character than is now in ordinary use.

In the drawings, A represents the body of the level, which is of the ordinary form and construction. Centrally in the body a circular opening B is formed, and in said opening two parallel disks $f$ of glass are secured by annular metallic rings $d$. These glasses are separated by a wire ring $g$, forming an air-tight circular chamber $h$. The glasses are also graduated at their edges at $i$ with the degrees of a circle. The chamber $h$ is half filled with a light liquid $j$, preferably ether, so that when the chamber is in vertical position the liquid-level $k$ registers with the horizontal diametrical line of the circle, as shown in Fig. 1. In the upper edge of the body A an ordinary spirit-level glass $m$ is disposed. Equidistant from the opening B, at each end of the body A, a circular opening $p$ is formed, and a plumb-glass $q$, of ordinary construction, is disposed in each of said openings. When the device is in horizontal position, the liquid-line $k$ registers with the horizontal diametrical line of the scale $i$ on the glasses $f$. The level-glass $m$ may be employed in the ordinary manner for determining the level. As the body is moved at any angle the liquid-line still retains the horizontal level and indicates on the scale $i$ the angle of inclination of the object on which the body A is placed. This enables the device to be used not only for the purposes of the ordinary plumb and level, but also as a protractor. The chamber $h$, being air-tight, as described, prevents the evaporation of the liquid, and where ether is employed variations of temperature have no appreciable effect thereon, the liquid-line registering at all times with the diametrical line of the circle.

It will be understood that the scale $i$ may be formed of one of the binding-rings $d$, if desired; but I prefer the same on the glass, as it enables the angles to be ascertained more gradually.

Having thus explained my invention, what I claim is—

1. A plumb and level comprising a body provided with a circular opening extending through said body, two parallel glass disks in said opening, each forming the front of a chamber, a wire ring separating said disks, annular metallic rings securing said disks together, all forming an air-tight chamber, and a liquid in said chamber.

2. A plumb and level comprising a body provided with a circular opening extending through said body, two parallel transparent disks, each forming a front of a chamber, provided with a graduated scale, a wire ring separating said disks, annular metallic rings securing said disks together, all forming an air-tight chamber, and a liquid in said chamber.

AGUSTUS G. TAYLOR.

Witnesses:
HARVEY LINCOLN,
ARABELLA S. LINCOLN.